United States Patent
Arroyo et al.

(10) Patent No.: US 9,038,065 B2
(45) Date of Patent: May 19, 2015

(54) INTEGRATED VIRTUAL INFRASTRUCTURE SYSTEM

(75) Inventors: Diana J. Arroyo, Austin, TX (US); Claris Castillo, White Plains, NY (US); James E. Hanson, Yorktown Heights, NY (US); Wolfgang Segmuller, Valhalla, NY (US); Michael J. Spreitzer, Croton-on-Hudson, NY (US); Malgorzata Steinder, Leonia, NJ (US); Asser N. Tantawi, Somers, NY (US); Ian N. Whalley, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 273 days.

(21) Appl. No.: 13/361,170

(22) Filed: Jan. 30, 2012

(65) Prior Publication Data

US 2013/0198740 A1 Aug. 1, 2013

(51) Int. Cl.
*G06F 9/455* (2006.01)
*G06F 9/46* (2006.01)
*G06F 9/445* (2006.01)
*H04L 12/24* (2006.01)
*H04L 29/08* (2006.01)

(52) U.S. Cl.
CPC ............ *G06F 9/45558* (2013.01); *H04L 67/10* (2013.01); *G06F 8/63* (2013.01); *G06F 2009/45562* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 2009/0070771 A1* | 3/2009 | Yuyitung et al. | 718/105 |
| 2011/0055385 A1* | 3/2011 | Tung et al. | 709/224 |
| 2011/0153684 A1* | 6/2011 | Yung | 707/805 |
| 2012/0054624 A1* | 3/2012 | Owens et al. | 715/735 |

OTHER PUBLICATIONS

Benson et. al., CloudNaaS: a cloud networking platform for enterprise applications, Oct. 2011, ACM, In Proceedings of the 2nd ACM Symposium on Cloud Computing (SOCC '11), Article 8, pp. 1-13.*
Nguyen et. al., A Framework for Dynamic Resource Provisioning and Adaptation in IaaS Clouds, Nov. 2011, IEEE Computer Society, In Proceedings of the 2011 IEEE Third International Conference on Cloud Computing Technology and Science (CLOUDCOM '11), pp. 312-319.*

(Continued)

*Primary Examiner* — Lewis A Bullock, Jr.
*Assistant Examiner* — Melissa Alfred
(74) *Attorney, Agent, or Firm* — Cantor Colburn LLP; Preston Young (57) ABSTRACT

A technique is provided for creating virtual units in a computing environment. A virtual system definition is received by a processor that is utilized to create the virtual units for a virtual system. Relationship constraints between the virtual units in the virtual system are received by the processor. The relationship constraints between the virtual units include a communication link requirement between the virtual units and/or a location requirement between the virtual units. The virtual units in the virtual system are deployed by the processor according to the relationship constraints between virtual units.

22 Claims, 8 Drawing Sheets

(56) References Cited

OTHER PUBLICATIONS

Benson et al., EPIC: Platform-as-a-Service Model for Cloud Networking, University of Wisconsin Madison, Computer Science Department, Technical Report #1686, Feb. 2011.*

T. Benson, et al., "CloudNaas: A Cloud Networking Platform for Enterprise Applications", SOCC'11, Oct. 27-28, 2011, Cascais, Portugal; Copyright 2011 ACM 978-1-4503-0976-09/11/10; 13 pages.

* cited by examiner

| | ABSTRACTIONS OFFERED | API | CAPABILITIES |
|---|---|---|---|
| SaaS OR APPLICATION MANAGEMENT PRESENTATION TIER — APPLICATION TIER — DATA TIER | APPLICATION API OR DATA ACCESS POINTS | APPLICATION SPECIFIC | OLTP, ANALYTICS, EVENT RULES, BUSINESS PROCESSES, ETC. |
| PaaS OR MIDDLEWARE MANAGEMENT WEB SERVER / APP SERVER / DBMS | APPLICATION OR DATA CONTAINER (MAY BE CLUSTERED) | CREATE AND DESTROY CONTAINERS, DEPLOY APPLICATION, DEFINE APPLICATION GOALS, WRITE AND READ DATA | LOAD BALANCE, ROUTE REQUESTS, PLACE CONTAINERS PLACE DATA PARTITIONS, MANAGE REPLICAS, ROUTE REQUESTS INSTALL AND CONFIGURE SOFTWARE STACKS MANAGE RELATIONAL DATA |
| ADVANCED IaaS | VIRTUAL NETWORKED CONTAINER | CREATE, DESTROY, MODIFY | DEPLOY AND MANAGE AT RUNTIME AN END-TO-END TOPOLOGY OF VIRTUALIZED ELEMENTS (VMs, NETWORK, AND STORAGE DEVICES) |
| IaaS | VIRTUAL MACHINE, DISK VOLUME, DISK IMAGE | CREATE, DESTROY, SNAPSHOT | PROVISION AND AUTOMATICALLY PLACE VIRTUAL MACHINES, MANAGE IMAGES |
| HARDWARE MANAGEMENT | SERVER, STORAGE DEVICE, NETWORK | DISCOVER, CONFIGURE, REBOOT | MONITORING, ENERGY MANAGEMENT, HARDWARE FAULT RECOVERY |

INTEGRATED VIRTUAL INFRASTRUCTURE SYSTEM

BACKGROUND

Exemplary embodiments relate to virtual units, and more specifically, relationships among virtual units in a cloud computing environment.

Utility/cloud computing delivers compute and storage resources to applications as an 'on-demand utility', similar to an electricity grid. The utility computing model is enabled by distributed collection of compute and storage resources spread over a local or a wide area network, i.e., networked utilities. Examples include scientific workflows running on computational grids and multi-tier web services (e.g., an e-commerce website) operating in data centers. The utility setting offers several benefits for applications: reduced infrastructure and management costs, higher resource utilization, and the ability to allocate resources on-demand to support dynamically changing demands, which results in reduced capital expenditure costs.

Virtual machine (VM) technology offers powerful mechanisms for efficient management of networked utilities. After a decade of advances in VMs, robust and efficient VM systems are widely available and are fast becoming ubiquitous. The leading VM systems support live migration, checkpoint/restart, and fine-grained allocation of server resources as a measured and metered quantity. These capabilities create a rich decision space for utility resource management such as how an intelligent infrastructure should "turn the knobs" to map workload and resource requests onto a server network.

Intelligent provisioning of VMs is necessary to meet system performance goals such as meeting application Service Level Agreements (SLAs), optimizing application execution time, and maximizing overall resource usage. However, provisioning VMs to meet such goals may be considered involved because application behavior is dictated by the interaction of several factors such as: Resources: The number of VMs assigned to the application, and the properties of the underlying resources bound to each VM, e.g., CPU, memory, storage, and network resources. Data: The characteristics of the data that the application processes such as the input data size, and its layout and partitioning on the storage server. Workload: The characteristics of the workload seen by the application, e.g., the request arrival rate, and the service demand of each request.

BRIEF SUMMARY

According to an exemplary embodiment, a method for creating virtual units in a computing environment is provided. A processor receives a virtual system definition that is utilized to create the virtual units for a virtual system, and receives relationship constraints between the virtual units in the virtual system. The relationship constraints between the virtual units include a communication link requirement between the virtual units and/or a location requirement between the virtual units. The processor deploys the virtual units in the virtual system according to the relationship constraints between virtual units.

According to an exemplary embodiment, a system for creating virtual units in a computing environment is provided. The system includes memory for storing a program. The system includes a processor functionally coupled to the memory and responsive to computer-executable instructions contained in the program. The processor receives a virtual system definition that is utilized to create the virtual units for a virtual system, and receives relationship constraints between the virtual units in the virtual system. The relationship constraints between the virtual units include a communication link requirement between the virtual units and/or a location requirement between the virtual units. The processor deploys the virtual units in the virtual system according to the relationship constraints between virtual units.

According to an exemplary embodiment, a computer program product for creating virtual units in a computing environment is provided. The computer program product includes a computer readable storage medium having computer readable program code embodied therewith. The computer readable program code includes receiving, by a processor, a virtual system definition that is utilized to create the virtual units for a virtual system, and receiving, by the processor, relationship constraints between the virtual units in the virtual system. The relationship constraints between the virtual units include a communication link requirement between the virtual units and/or a location requirement between the virtual units. The computer readable program code includes deploying, by the processor, the virtual units in the virtual system according to the relationship constraints between virtual units.

According to an exemplary embodiment, a method for creating virtual units in a computing environment is provided. A processor receives a virtual system definition that is utilized to create at least one virtual unit for a virtual system. The processor receives relationship constraints between the one (or more) virtual unit and at least one of another virtual unit of another virtual system and a component of the computing environment. The relationship constraints include at least one of a communication link requirement and a location requirement. The processor deploys the one (or more) virtual unit in the virtual system according to the relationship constraints.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Exemplary embodiments are configured to (1) design an integrated virtual infrastructure system, made from virtual units and their relationships; (2) provide a method for the operation and management of such a virtual system that is available to a cloud user (through, e.g., an application programming interface (API)); and (3) provide a method for mapping such an integrated virtual infrastructure system onto the physical infrastructure.

In cloud computing, a cloud provider makes virtual units available to cloud users to deploy and run their applications. Such virtual units include virtual machines, virtual stores (storage), virtual images, and virtual networks. These virtual units are provided through a virtualization layer on top of the actual physical resource units, such as physical servers, storage servers, communication links and routers. Through an interface to this virtualization layer, a cloud user requests virtual units and connects them to create an infrastructure where she can run her application. Specific application solutions may be provided by a cloud platform service provider as a service. An issue that a cloud user may face is that the cloud user obtains individual virtual units without being able to specify requirements on the collection of virtual units that the cloud user is requesting. Examples of such requirements are communication bandwidths among virtual machines, availability needs for virtual machines, and specific topological requirements for the collection of virtual units when deployed in the physical infrastructure.

The burden is put on the cloud user to create a virtual infrastructure, built from individual virtual units. Existing solutions in the state of the art is for some cloud providers to make some pre-built virtual infrastructures available to cloud users, with the promise of a faster deployment. Such pre-built virtual infrastructures may not meet the user's requirements. Exemplary embodiments provide a seamless solution where the requirements about the virtual infrastructure, such as resource demands, inter-unit communications demands, location relationships, and high availability, are automatically translated into an integrated virtual infrastructure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Further information regarding cloud computing may be found in the "Draft NIST Working Definition of Cloud Computing" by Peter Mell and Tim Grance, 7 Oct. 2009, which is herein incorporated by reference in its entirety.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models which are discussed below.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email).

The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
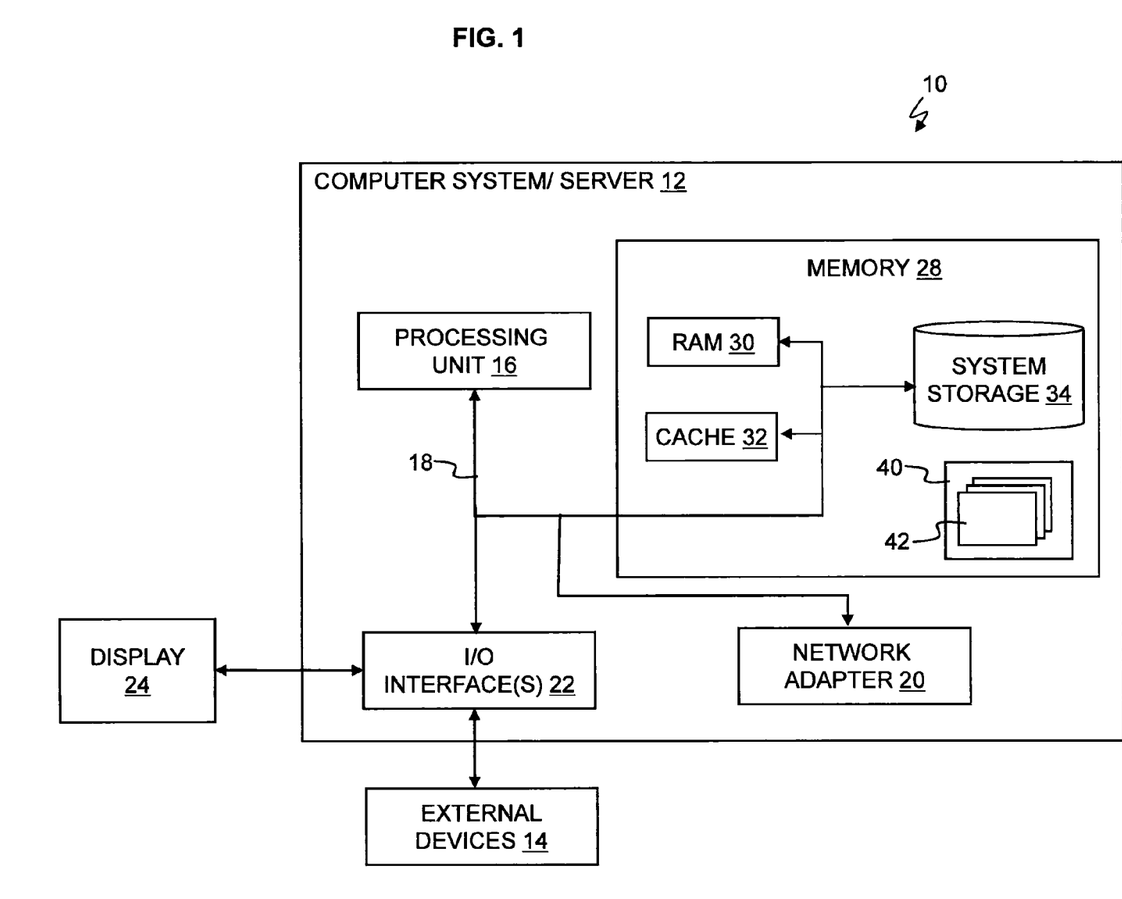
FIG. 1 illustrates a schematic of an example of a cloud computing node in accordance with an exemplary embodiment.

Referring now to FIG. 1, there is illustrated a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above and below.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
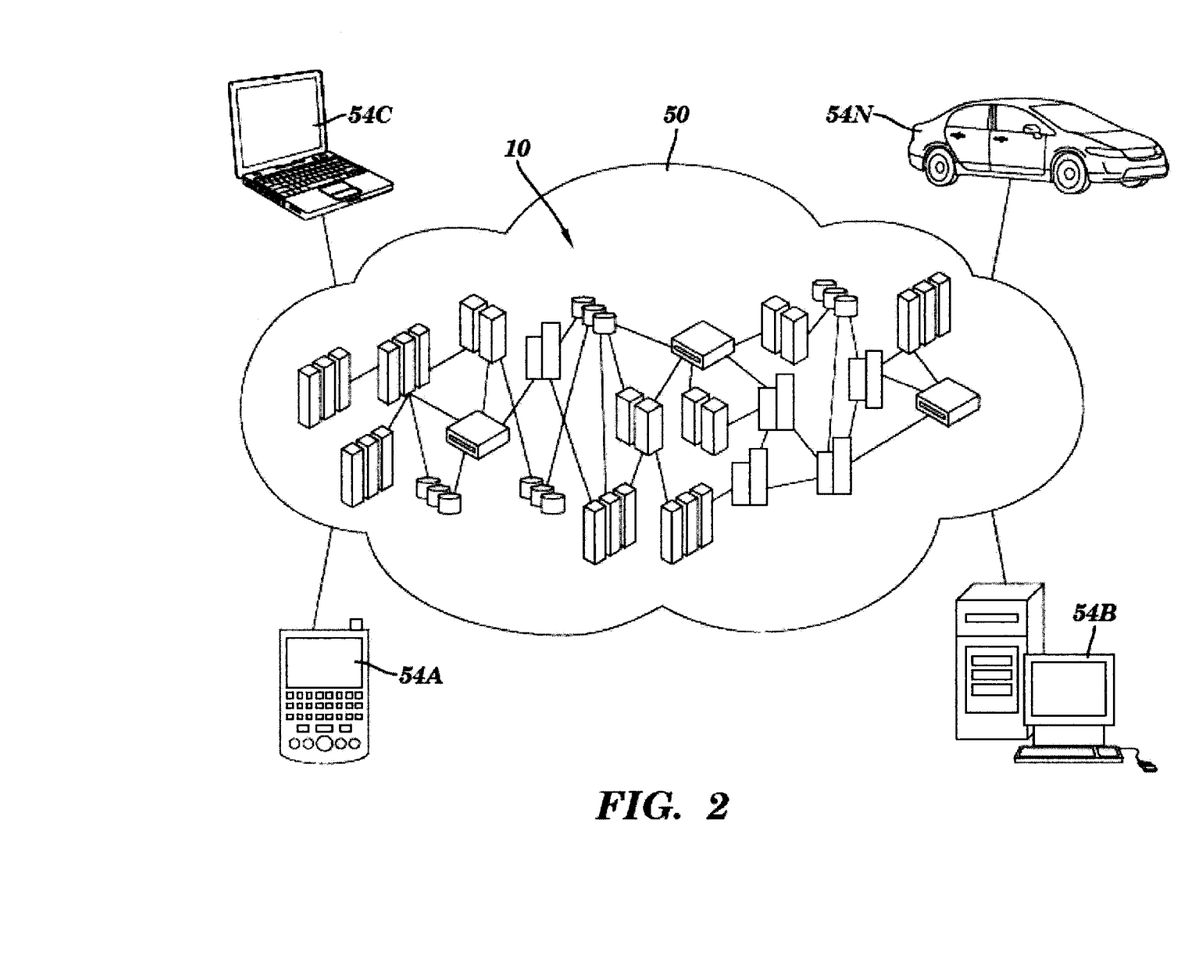
FIG. 2 illustrates a cloud computing environment in accordance with an exemplary embodiment.

Referring now to FIG. 2, there is illustrated a cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). The computing nodes 10 may include multiple computing systems/servers 12 operatively connected to function and operate in the cloud computer environment 50.

Figure 3:
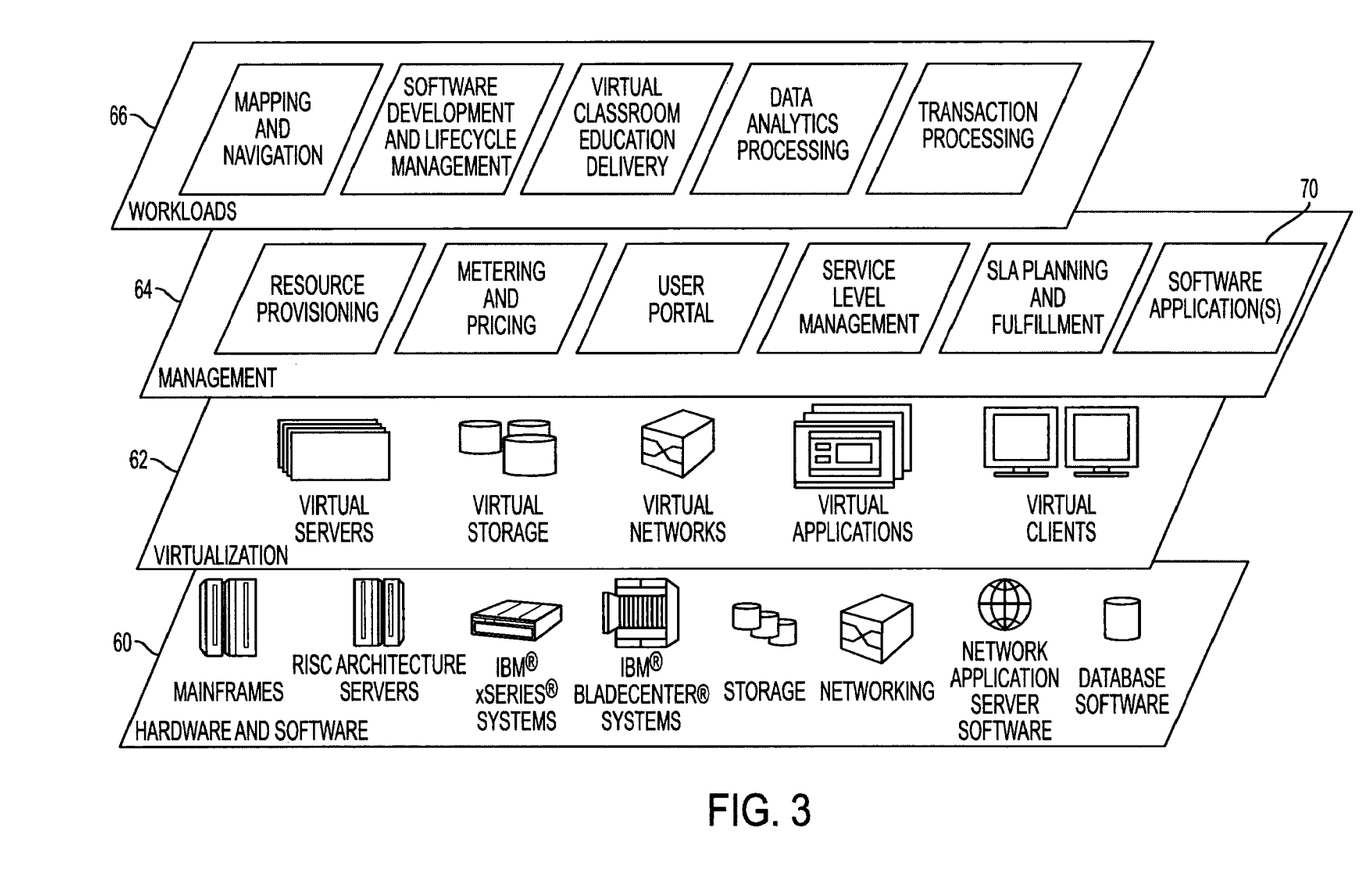
FIG. 3 illustrates a set of functional abstraction layers provided by a cloud computing environment in accordance with an exemplary embodiment.

Referring now to FIG. 3, there is illustrated a set of functional abstraction layers provided by cloud computing environment 50 (shown in FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer 64 also includes a forecasting-based service assignment module.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further, other types of workloads may also include web service workloads, enterprise applications such as billing and customer relationship management, various banking and finance applications, etc.

A software application 70 comprises one or more algorithms to implement exemplary embodiments. The software application 70 may be representative of one or more software applications configured to working together, e.g., over a distributed computing network. The software application 70 may be coupled to and/or reside in the memory 28 of computer system/server 12. The software application 70 may comprise one or more program modules 42 of the program/utility 40. Also, the software application 70 may be part of the management layer 64 and may be run on hardware in the hardware and software layer 60. Also, the software application 70 is configured to implement one or more application programming interfaces (API).

Figure 4:
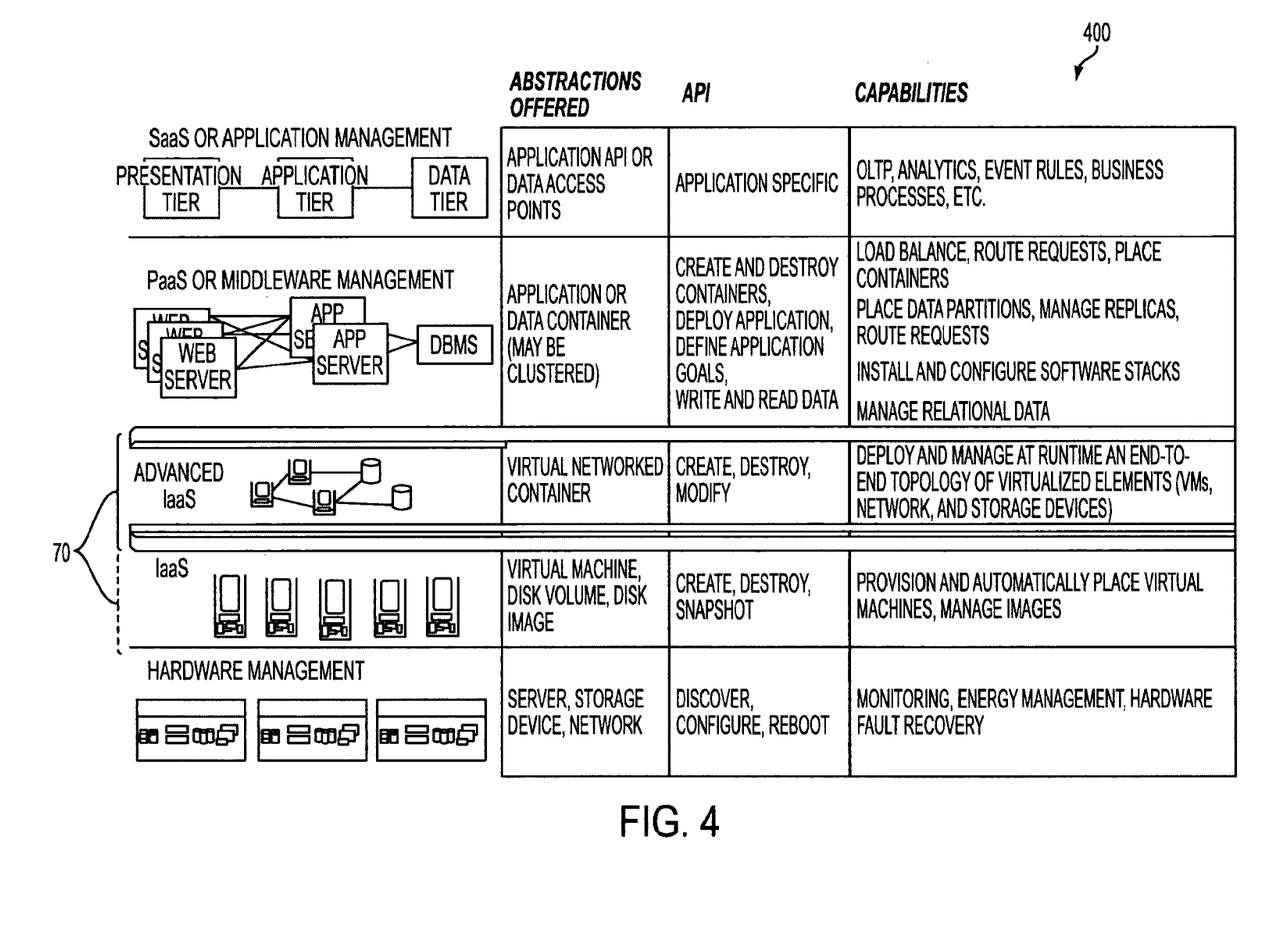
FIG. 4 illustrates a hierarchical example of a logical cloud architecture according to an exemplary embodiment.

FIG. 4 illustrates a hierarchical example of a logical cloud architecture 400 (that can be implemented in the cloud computing environment 50) according to an exemplary embodiment. The logical cloud architecture 400 may include the software as a service (SaaS), platform as a service (PaaS), infrastructure as a service (IaaS), and hardware (physical resources), as discussed above. Additionally, the logical cloud architecture 400 includes an advanced IasS which can be implemented by the software application 70. As one option, the software application 70 may also include and/or be integrated with the functionality of the standard IaaS. The software application 70 is configured to deploy (i.e. set up) virtual units (in a virtual system) for a cloud user in accordance with relationship constraints (e.g., relationship constraints 625 discussed in FIG. 6 below) required among the virtual units. Also, the software application 70 is configured to provide and/or interact with a graphical user interface (e.g., such as graphical user interface 620 in FIG. 6) in which the cloud user can specify the virtual units of the virtual system and can specify relationship constraints between each virtual unit in the virtual system. The relationship constraints are policies governing the (virtual and/or physical) relationship between two or more virtual units.

Figure 5:
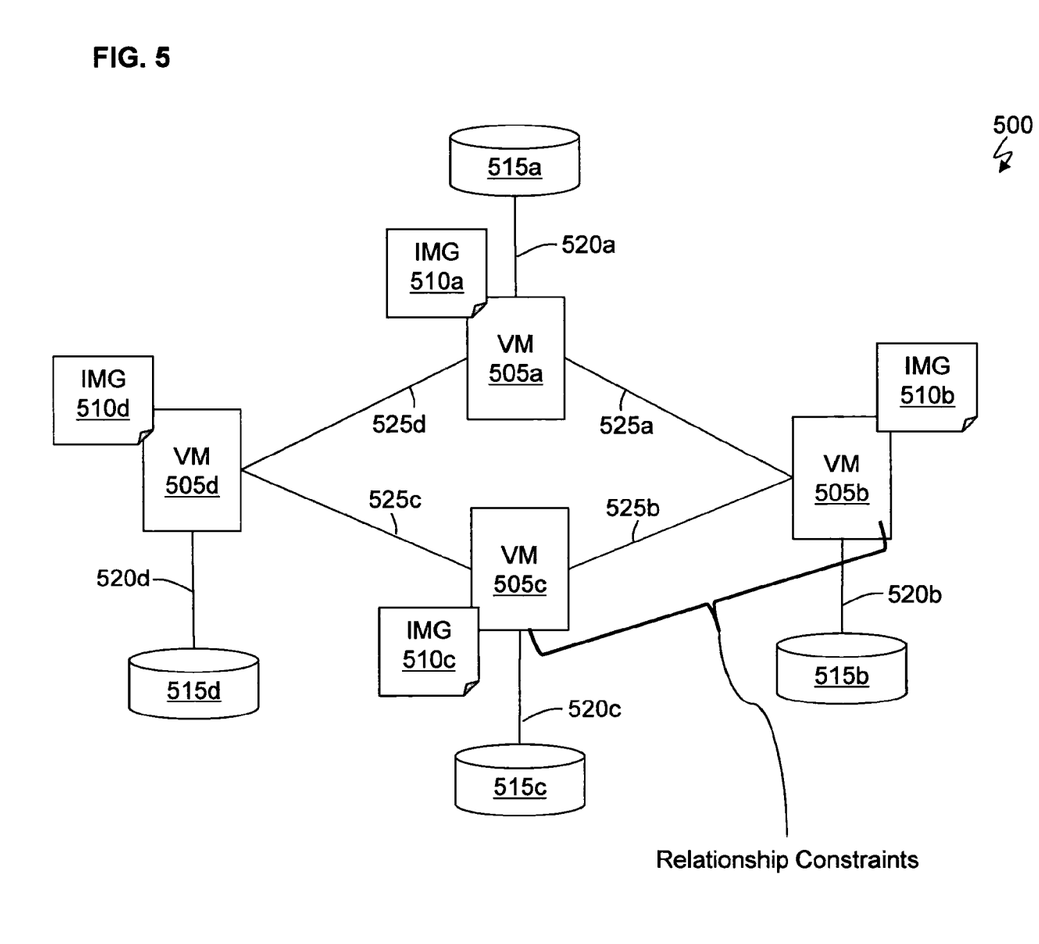
FIG. 5 illustrates an example of virtual units operatively connected in a virtual system according to an exemplary embodiment.

FIG. 5 illustrates an example of virtual units in a virtual system 500 according to an exemplary embodiment. The virtual system 500 may have been specified by and may belong to a cloud user (e.g., via the graphical user interface 620). The virtual system 500 may be provisioned and/or running on any of the hardware and software components (physical resources) of the hardware and software layer 60 (in the cloud computing environment 50) discussed herein, such as on the computer system/server 12.

The virtual system 500 may include a set of related virtual units. The virtual units may be virtual machines (VM), virtual images, virtual networks, and virtual storage volumes. In FIG. 5, the virtual units include virtual machines 505a-d (collectively referred to as 505) each having its own virtual image 510a-d (collectively referred to as 510). A virtual image may be the operating system, software applications, etc., running on the virtual machine. Each virtual machine 505a-d may be operatively connected to its virtual storage 515a-d (collectively referred to as 515) through respective virtual communication network links 520a-d (collectively referred to as 520). The virtual machines 505a-d may be operatively connected through virtual communication network links 525a-d (collectively referred to as 525). The virtual system 500 may be derived from metadata of a middleware pattern.

Figure 6:
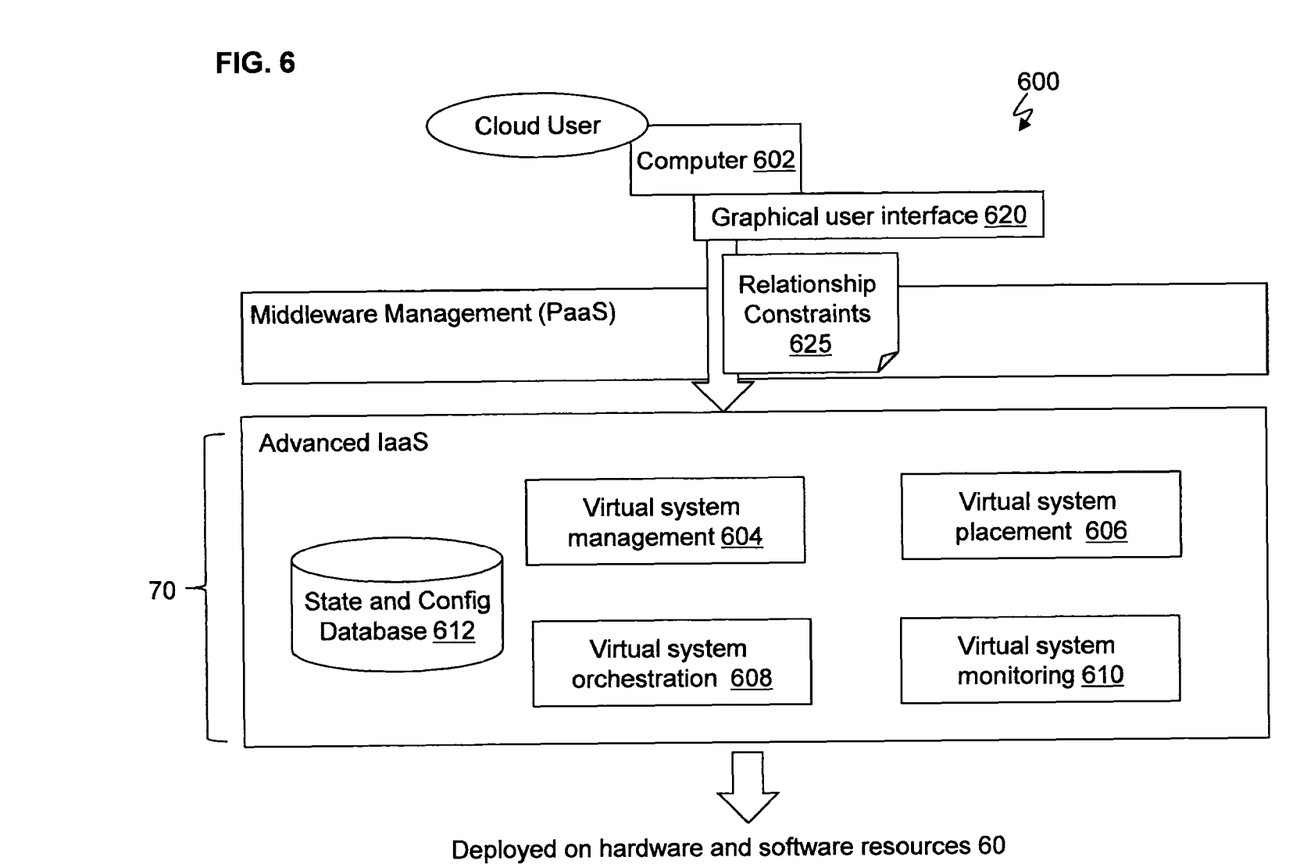
FIG. 6 is a block diagram of an expanded view of the advanced IaaS layer in the logical cloud architecture according to an exemplary embodiment.

Reference will be made to FIGS. 5 and 6. FIG. 6 is a block diagram 600 of an expanded view of the advanced IaaS layer (of the software application 70) in the logical cloud architecture 400 according to an exemplary embodiment. The advanced IaaS layer can include the functionality of a standard IaaS layer. Although not shown in FIG. 6 for conciseness, the application management (SaaS) layer, middleware management (PaaS) layer, and hardware management layer are part of and function in the block diagram 600 as understood by one skilled in the art. Initially, the cloud user on computer 602 may specify requirements for the virtual system 500 in the graphical user interface 620 and/or to an administrator of the cloud computing environment 50, along with relationship constraints 625. The software application 70 may provide, be integrated with, and/or communicate with the graphical user interface 620 via the middleware management layer to receive specifications for the virtual system 500. The middleware management (e.g., one or more software applications running on the computer system/server 12) may be configured to determine and create the pattern definition for the virtual system 500 of the cloud user based on the user's specifications/requirements. The software application 70 utilizes the user's specifications/requirements to create and deploy virtual machines 505, virtual images 510, virtual storages 515, virtual communication network links 520, and virtual communication network links 525.

When implementing the advanced IaaS, the software application 70 may include a virtual management system module 604, a virtual system placement module 606, a virtual system orchestration module 608, and a virtual system monitoring module 610. Also, the advanced IaaS may include a state and configuration database 612 in which the software application 70 communicates with.

The virtual system management module 604 knows the structure of the virtual system 500 that is needed for the cloud user and maintains this structure in the state and configuration database 612. The virtual system placement module 606 maps the virtual units 505, 510, 515, 520, and 525 of the virtual system 500 to the (physical) hardware and software resources in the cloud computing environment 50 according to the relationship constraints 625 among the virtual units. The virtual system orchestration module 608 interacts with the bottom layer to create, modify, and destroy virtual units in the (physical) hardware and software resources in the computing environment. The virtual system orchestration module 608 stores the configuration of the virtual units in the state and configuration database 612.

Referring back to FIG. 5, the software application 70 is configured to receive the specifications (i.e., demand) from the user on computer 602 (which may include features of computer system/server 12 as understood by one skilled in the art) for creating the virtual system 500, and the software application 70 is configured create and deploy the virtual system 500. Each virtual machine 505 may include its own computer processing unit capability (e.g., such as a processing speed), random access memory (RAM) size, input/output (I/O) size, etc., based on the demand specified from the user. The virtual images 510 may be the operating system, software applications, computer processes, etc., that are respectively run on the virtual machines 505 based on the specifications of the user.

Unlike state of the art systems in a cloud computing environment, the user on computer 602 can specify requirements (i.e., relationship constraints 625) between each virtual machine 505 and its virtual storage 515. For example, between VM 505$a$ and virtual storage 515$a$, the user can specify and the software application 70 creates the virtual communication network link 520$a$ with a particular bandwidth (and/or bit rate), e.g., such as 1 gigabit/second. Similarly, the software application 70 is configured to provide and meet specified bandwidth (bit rate) requirements on virtual communication network links 520$b$-520$b$ operatively connecting VM 505$b$-$d$ and their respective virtual storages 515$b$-$d$.

Additionally, the user can specify and the software application 70 creates the virtual communication network link 525$a$ with a particular bandwidth (and/or bit rate), e.g., such as 1 megabit/second between VM 505$a$ and VM 505$b$ and/or with a latency of no more than 5 milliseconds for transmitting X amount (e.g., 100) packets between VM 505$a$ and VM 505$b$. Likewise, the software application 70 is configured to provide and meet the specified bandwidth (bit rate) and latency requirements between any two VM 505$a$-$d$ operatively connected by their virtual communication network links 525$a$-$d$, based on the relationship constraints 625 specified by the user on the computer 602 via the graphical user interface 620.

Also, the user on computer 602 can specify requirements (i.e., relationship constraints 625) between each virtual machine 505 and another virtual machine 505. In this case, between any virtual machines 505, the user can specify anti-collocation and/or collocation constraints along with bandwidth and latency constraints on the virtual communication network links 520 and 525. For example, the user on computer 602 can specify that VM 505$b$ and VM 505$c$ are to be anti-collocated (e.g., in different zones) within the virtual system 500. Upon receiving this relationship constraint 625 between VM 505$b$ and VM 505$c$, the software application 70 is configured to place/deploy VM 505$b$ in a separate and distinct zone from VM 505$c$ within the virtual system 500. Zones in the cloud computing environment 50 can be a rack and/or set of racks of hardware equipment such as servers and storage equipment (at different locations) in the cloud computing environment 50. The software application 70 is configured to place/deploy the VM 505$b$ in one zone (e.g., a rack and/or set of racks) on one side of the cloud computing environment 50 (in a building) and place/deploy the VM 505$c$ in a different zone (e.g., another rack and/or set of racks) on another side of the cloud computing environment 50 (e.g., another side of the building). Additionally, zones in the cloud computing environment 50 can be distinct geographical locations, such as different buildings (such as datacenters, server farms, etc.) housing the hardware and software equipment, different cities, different states, different countries, etc., that are separate from one another. Accordingly, the software application 70 is configured to place/deploy the VM 505$b$ in one zone at a geographical location (e.g., one datacenter, city, and/or state) in the cloud computing environment 50 and place/deploy the VM 505$c$ in another zone at a different geographical location (e.g., different datacenter, city, and/or state) in the cloud computing environment 50, based on receiving the anti-collocation relationship constraint 625 between VM 505$b$ and VM 505$c$ from the user. The software application 70 is configured to determine the proper zones for each VM 505$a$-$d$ in order to deploy each VM based on anti-collocation and/or collocation relationship constraints 625 between any virtual machine 505 as specified by the user on computer 602. Additionally, the cloud user may specify a high availability constraint for certain virtual machines 505, and the software application 70 receives and is configured to translate the high availability constraint for the specified virtual machines 505 into an anti-collocation relationship constraint 625 between the virtual machines. As such to meet a high availability relationship constraint 625 between VM 505$b$ and VM 505$c$, the software application 70 automatically deploys these two virtual machines 505$b$ and 505$c$ in different zones (which can ensure their availability if one zone becomes inoperable) in the cloud computing environment 50.

As another example, the user on computer 602 can specify that VM 505a and VM 505d are to be collocated (e.g., in the same zone (or may be adjacent zones)) within the virtual system 500. Upon receiving this relationship constraint 625 between VM 505a and VM 505d, the software application 70 is configured to place/deploy VM 505a in the same zone as VM 505d within the virtual system 500. In one case, the software application 70 is configured to place/deploy the VM 505a and VM 505d in the same zone (e.g., the same rack and/or same set of racks) in the cloud computing environment 50, which may be the same side of a building in the cloud computing environment 50. Additionally, the software application 70 is configured to place/deploy the VM 505a and VM 505d in the same zone which can be the same geographical location (e.g., the same datacenter, city, and/or state) in the cloud computing environment 50, based on receiving the collocation relationship constraint 625 between VM 505a and VM 505d.

Also, the user of the computer 602 may include a licensing constraint/requirement 625, which can be accounted for and satisfied by the software application 70 when building the virtual system 500. The licensing requirement may cause the software application 70 to place virtual images 510a and 510b on two separate virtual machines 505a and 505b, respectively. Additionally, the software application 70 may translate the licensing requirement as an anti-collocation requirement such that the virtual images 510a and 510b are deployed in separate zones (as discussed above).

Although examples are provided herein with virtual machines 505, relationship constraints 625 can be applied by the software application 70 for any combination of the virtual units. For example, relationship constraints 625 may be applied between two or more virtual images, between a virtual image and virtual storage, between a virtual machine and virtual storage, and between any of the virtual units (in any combination of two or more virtual units).

Further, in reference to the relationship (communication) constraints between a pair of virtual units in a virtual system, two types of examples have been mentioned, namely bandwidth (or capacity) and delay (or latency). More generally, there may be other encompassing communication network performance metrics, such as, e.g., measures related to probability distributions of delay and/or link capacity; these measures can also be defined as relationship constraints. In one case, delay and bandwidth can refer to the average of such probability distributions. Measures defining percentiles of delay and capacity and/or standard deviations of delay and capacity, such as related to jitter, would be derived from probability distribution metrics; these measures can also be utilized to define relationship constraints. Although examples of relationship constraints are provided to ease understanding, the disclosure is not meant to be limited.

In addition to fulfilling resource requirements for hardware and software to instantiate virtual units 505, 510, 515, 520, and 525 in the virtual system 500, the software application 70 is configured to simultaneously meet multiple relationship constraints/requirements 625 between each virtual unit within the virtual system 500 deployed in the cloud computing environment 50.

The graphical user interface 620 for entering specifications and relationship constraints may be provided to the computer 602 by the software application 70 alone and/or in cooperation with additional layers (such as application management (SaaS) layer and middleware management (PaaS) layer).

The software application 70, e.g., on the computer system/server 12 may represent one or more APIs that interact with and/or provide the graphical user interface 620 utilized by the user on the computer 602. The software application 70 is the mechanism (which can be via the graphical user interface 620) that allows the cloud user to create a virtual system definition which is utilized as the pattern for the virtual system 500. For example, the software application 70 is configured to allow the following to be requested by the user on computer 602 (which is translated and implemented by the software application 70 into the virtual system 500):

(1) Create the virtual system definition. For example, the user can provide the specifications and relationship constraints 625 for the virtual units in the virtual system 500.

(2) Modify the virtual system definition, which includes adding, removing, and/or modifying virtual units and policies governing relationships (i.e., relationship constraints 625) among the virtual units. The cloud user can also modify, add, and/or remove one or more of the relationship constraints 625 without affecting other relationship constraints 625.

(3) Destroy the virtual system definition: For example, the user can remove the virtual system 500 from the cloud computing environment 50.

(4) Join and split the virtual system definition. To be executed by the software application 70, the user can combine multiple virtual system definitions (such as combine the virtual system definition for building the virtual system 500 with another virtual system definition) and/or create multiple sub-virtual systems by, e.g., splitting the virtual system 500 into smaller interconnected multiple virtual systems. Also, the user can create client service relationships (e.g., client-server relationships between virtual machines) and peer-to-peer relationships among the virtual units in the virtual system 500.

The software application 70 (in conjunction with standard functionality of the IaaS layer) deploys (instances of) the virtual units 505, 510, 515, 520, and 525 in the virtual system 500, according to the request (which includes the relationship constraints 625) of the cloud user. The software application 70 (e.g., via one or more APIs) on the computer system/server 12 can interact with and/or provide the graphical user interface 620 so that the cloud user on the computer 602 can manage (instances of) the virtual system 500. For example, the software application 70 is configured to manage the virtual system 500 that has already be built and allow the following to be requested by the user on computer 602 (which is translated and implemented by the software application 70):

(1) Deploy virtual system instance. The software application 70 (in conjunction with standard functionality of the IaaS layer) takes the virtual system definition of the virtual system 500 and instantiates the virtual units of the virtual system 500 on the virtual resources (e.g., onto the hardware and software components of hardware and software layer 60). The software application 70 makes the virtual system definitions available to the cloud user (publicly or privately) via standard publishing mechanisms.

(2) Modify virtual system instance. The software application 70 (e.g., by request of the cloud user) can change the virtual system 500 by adding, removing, and/or modifying the virtual units and policies governing relationship among virtual units.

(3) Destroy virtual system definition.

(4) Join and/or split virtual system instance. The software application 70 can join the virtual system 500 with another virtual system (like virtual system 500). Also, the software application 70 can split the virtual system 500 into smaller virtual systems.

Referring to FIG. 6, the virtual system monitor 610 (of the software application 70) is configured to provide runtime placement adjustment to ensure that relationships constraints between virtual units are satisfied. The virtual system monitor 610 monitors data so that the software application 70 (and/or an administrator on the computer system/server 12) can make changes to the virtual system 500 to accommodate changes in the workload.

The management layer 64 (and/or the software application 70) may be configured for performance management in the cloud computing environment 50 to prevent hotspots in the physical machines (hardware) and network by using migration. The management layer 64 (e.g., one or more software applications 70) can migrate (and recommend migration of) virtual units from one or more computer systems/servers 12 to other computer systems/servers 12 to improve performance of the virtual units and/or to continuously satisfy relationship constraints 625. Also, the management layer 64 is configured for power management in the cloud computing environment 50. The management layer 64 can utilize past history of hardware in the cloud computing environment 50 to determine the cost of turning on a machine (such as one of the computer systems/servers 12). The management layer 64 may be configured to power on and power off hardware to relieve heating.

Figure 7:
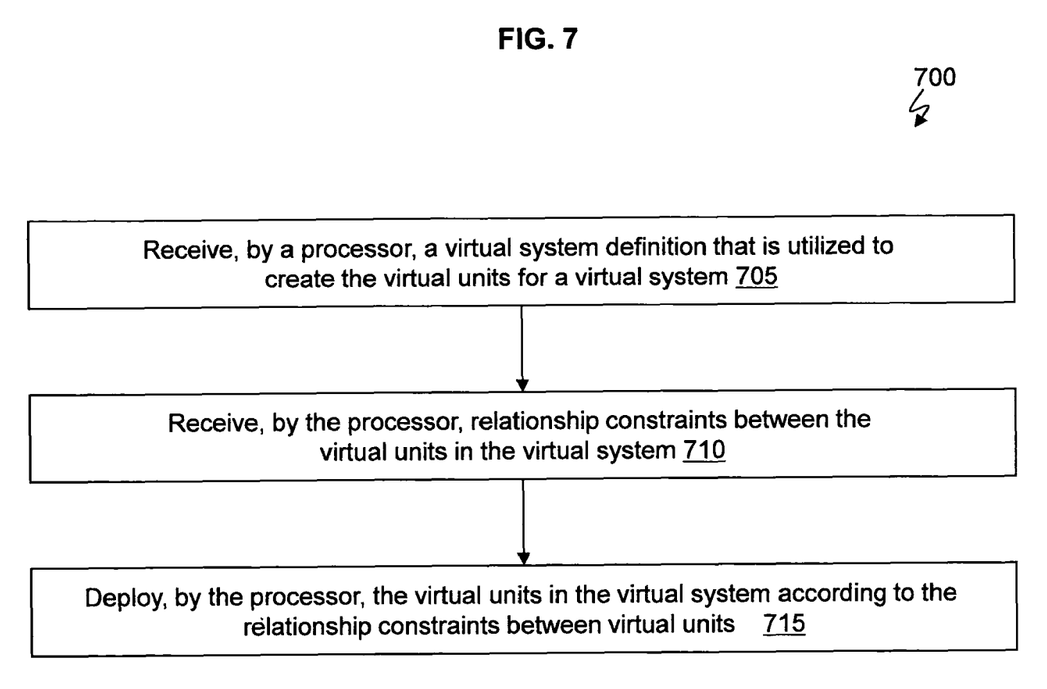
FIG. 7 illustrates a method for creating and deploying virtual units in a virtual system of a cloud computing environment according to an exemplary embodiment.

FIG. 7 illustrates a method 700 by software application 70 on a computer such as the computer system/server 12 for creating and deploying virtual units in a cloud computing environment 50 according to an exemplary embodiment.

The software application 70 on the computer system/server 12 is configured to receive a virtual system definition that is utilized to create the virtual units for a virtual system such as the virtual system 500 at block 705. Also, the software application 70 is configured to receive relationship constraints 625 between the virtual units (such as between virtual units 505*a-d*, 510*a-d*, 515*a-d*, 520*a-d*, and 525*a-d* in any varied combination) in the virtual system 500 at block 710. The relationship constraints 625 between the virtual units can include a communication link requirement between the virtual units and/or a location requirement between the virtual units. At block 715, the software application 70 is configured to deploy the virtual units in the virtual system 500 according to the relationship constraints 625 between virtual units as specified by the cloud user on the computer 602.

Further, deploying the virtual units in the virtual system according to the communication link requirement between the virtual units may comprise the software application 70 satisfying a communication bandwidth requirement between the virtual units and/or satisfying a latency requirement between the virtual units. Satisfying the communication bandwidth requirement between the virtual units and the latency requirement between the virtual units only applies within the cloud computing environment 50. That is, the communication bandwidth requirement (of the relationship constraint 625) is within the virtual system 500 (itself) and does not apply to, e.g., the outside communication link between the user's computer 602 and software application 70 on the computing system/server 12. Also, the communication bandwidth requirement may not apply between the computer 602 and its communication link to the computing environment 50.

Deploying the virtual units in the virtual system according to the location requirement between the virtual units can include the software application 70 satisfying a collocation requirement between two or more virtual units and/or satisfying an anti-collocation requirement between two or more virtual units. The collocation requirement causes the two or more virtual units to be instantiated in the same zone, and the anti-collocation requirement causes the two or more virtual units to be instantiated in separates zones. The software application 70 is configured to provide a mechanism for a user to specify the virtual system definition that is utilized to create the virtual units and the mechanism for the user to specify each of the relationship constraints 625 between the virtual units in the virtual system. The software application 70 is configured to migrate (move) the virtual units in the virtual system from one machine (e.g., the computer system/server 12) to another machine (e.g., a different computer system/server 12) in the cloud computing environment 50 to meet performance requirements.

Although examples have been described relationship constraints between virtual units within the same virtual system (e.g., between virtual units in the virtual system 500), these examples are provided for explanation purpose and the disclosure is not meant to be limited. There can be more general relationship constraints with virtual units outside of the virtual system 500.

Figure 8:
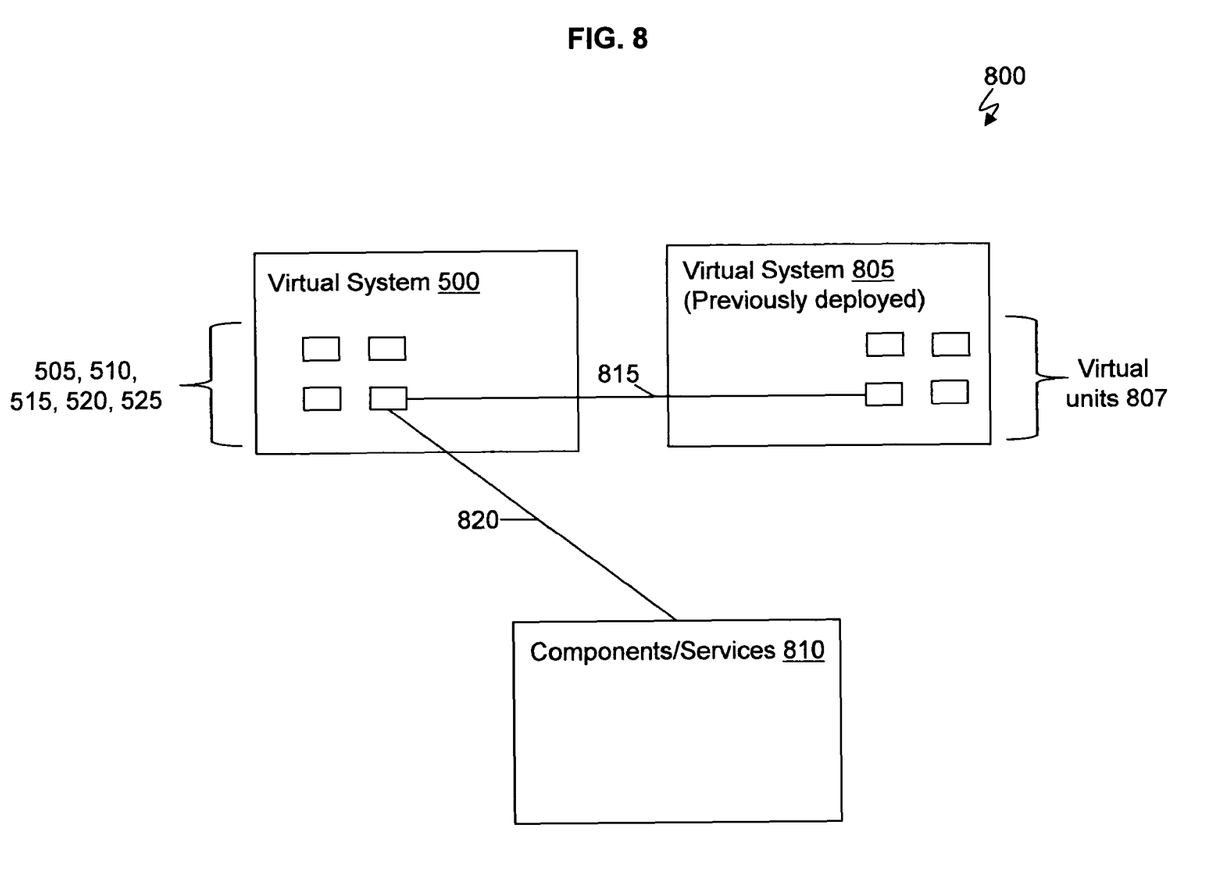
FIG. 8 is a block diagram of relationship constraints for relationships extending outside of a virtual system according to an exemplary embodiment.

These virtual units outside of the virtual system 500 may be, e.g., (1) virtual units already deployed (stand-alone and/or part of other virtual systems) and/or (2) non-virtual units accessible within the cloud computer environment 50 (such as components and/or services defined by the cloud provider and directly accessible by cloud users), where deployment satisfies the relationship constraints as well. An example is provided in FIG. 8. FIG. 8 is a block diagram 800 of the virtual system 500 having its respective virtual units discussed above, another virtual system 805 (which can have similar virtual units as discussed above for the virtual system 500), and components/services 810 provided by the cloud provider of the cloud computer environment 50. The components/services 810 may include various hardware components such as servers, storages devices, processors, etc., in the cloud computer environment 50. Also, the components/services 810 may include various services offered by the cloud provider (cloud administrator) such as look up services, etc. Relationship constraint 815 is between any one or more virtual units 505-525 in virtual system 500 and any virtual units 807 in the other virtual system 805. Relationship constraint 820 is between any one or more virtual units 505-525 and the components/services 810. The relationship constraints 815 and 820 may include any of the types of relationship constraints (e.g., relationship constraints 625) discussed herein. Although not shown for the sake of conciseness, various virtual (and physical) communication links can connect the virtual system 500, the other virtual system 805, and the components/services 810, as understood by one skilled in the art and as discussed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for creating virtual units in a computing environment, comprising:
   receiving, by a processor, a virtual system definition that is utilized to create the virtual units for a virtual system;
   receiving, by the processor, relationship constraints between the virtual units in the virtual system, wherein the relationship constraints between the virtual units specify policies governing the virtual and physical relationship between the virtual units and comprise a communication link requirement between the virtual units and a location requirement between the virtual units;
   receiving a high availability relationship constraint that indicates conditions for executing two particular virtual units of the virtual units from a user;
   in response to receiving the high availability relationship constraint, automatically translating the high availability relationship constraint for the two particular virtual units into an anti-collocation requirement for the two particular virtual units such that the two particular virtual units are instantiated into separate zones in line with the high availability constraints;
   calculating a probability distribution relationship constraint related to communication network performance metrics, in which the probability distribution relationship constraint defines percentiles of the communication network performance metrics and defines standard deviations of the communication network performance metrics, wherein the network performance metrics include delay or link capacity; and
   deploying, by the processor, the virtual units in the virtual system according to the relationship constraints, anti-collocation requirement, and the probability distribution relationship constraint.

2. The method of claim 1, further comprising deploying the virtual units in the virtual system according to the communication link requirement between the virtual units, the communication link requirement comprising at least one of satisfying a communication bandwidth requirement between the virtual units and satisfying a latency requirement between the virtual units.

3. The method of claim 2, wherein satisfying the communication bandwidth requirement between the virtual units and the latency requirement between the virtual units only applies within the computing environment;
   receiving an adjacent zones relationship constraint for certain virtual units;
   placing the certain virtual units in a same set of racks in the computing environment.

4. The method of claim 1, further comprising deploying the virtual units in the virtual system according to the location requirement between the virtual units, the location requirement comprising satisfying a collocation requirement between two or more virtual units.

5. The method of claim 4, wherein the collocation requirement causes the two or more virtual units to be instantiated in a same zone.

6. The method of claim 1, further comprising providing, by the processor, a mechanism for a user to specify the virtual system definition that is utilized to create the virtual units; and
   providing, by the processor, the mechanism for the user to specify each of the relationship constraints between the virtual units in the virtual system.

7. The method of claim 1, further comprising migrating the virtual units in the virtual system from one machine to another machine in the computing environment to meet performance requirements.

8. A system for creating virtual units in a computing environment, comprising:
   a non-transitory memory configured to store a program; and a processor, functionally coupled to the memory, the processor being responsive to computer-executable instructions contained in the program and operative to:
   receive, by the processor, a virtual system definition that is utilized to create the virtual units for a virtual system;
   receive, by the processor, relationship constraints between the virtual units in the virtual system, wherein the relationship constraints between the virtual units specify policies governing the virtual and physical relationship between the virtual units and comprise a communication link requirement between the virtual units and a location requirement between the virtual units;
   receive a high availability relationship constraint that indicates conditions for executing two particular virtual units of the virtual units from a user;
   in response to receiving the high availability relationship constraint, automatically translate the high availability relationship constraint for the two particular virtual units into an anti-collocation requirement for the two particular virtual units such that the two particular virtual units are instantiated into the separate zones in line with the high availability constraints;
   calculate a probability distribution relationship constraint related to communication network performance metrics, in which the probability distribution relationship constraint defines percentiles of the communication network performance metrics and defines standard deviations of the communication network performance metrics, wherein the network performance metrics include delay or link capacity; and
   deploy, by the processor, the virtual units in the virtual system according to the relationship constraints, anti-collocation requirement, and the probability distribution relationship constraint.

9. The system of claim 8, further comprising deploying the virtual units in the virtual system according to the communication link requirement between the virtual units, the communication link requirement comprising at least one of satisfying a communication bandwidth requirement between the virtual units and satisfying a latency requirement between the virtual units.

10. The system of claim 9, wherein satisfying the communication bandwidth requirement between the virtual units and the latency requirement between the virtual units only applies within the computing environment.

11. The system of claim 8, further comprising deploying the virtual units in the virtual system according to the location requirement between the virtual units, the location requirement comprising satisfying a collocation requirement between two or more virtual units.

12. The system of claim 11, wherein the collocation requirement causes the two or more virtual units to be instantiated in a same zone.

13. The system of claim 8, further comprising providing, by the processor, a mechanism for a user to specify the virtual system definition that is utilized to create the virtual units; and providing, by the processor, the mechanism for the user to specify each of the relationship constraints between the virtual units in the virtual system.

14. The system of claim 8, further comprising migrating the virtual units in the virtual system from one machine to another machine in the computing environment to meet performance requirements.

15. A computer program product for creating virtual units in a computing environment, the computer program product comprising:
   a non-transitory computer readable storage medium having computer readable program code embodied therewith, the computer readable program code comprising:
      receiving, by a processor, a virtual system definition that is utilized to create the virtual units for a virtual system;
      receiving, by the processor, relationship constraints between the virtual units in the virtual system, wherein the relationship constraints between the virtual units specify policies governing the virtual and physical relationship between the virtual units and comprise a communication link requirement between the virtual units and a location requirement between the virtual units;
      receiving a high availability relationship constraint that indicates conditions for executing two particular virtual units of the virtual units from a user;
      in response to receiving the high availability relationship constraint, automatically translating the high availability relationship constraint for the two particular virtual units into an anti-collocation requirement for the two particular virtual units such that the two particular virtual units are instantiated into separate zones in line with the high availability constraints;
      calculating a probability distribution relationship constraint related to communication network performance metrics, in which the probability distribution relationship constraint defines percentiles of the communication network performance metrics and defines standard deviations of the communication network performance metrics, wherein the network performance metrics include delay or link capacity; and deploying, by the processor, the virtual units in the virtual system according to the relationship constraints between the virtual units.

16. The computer program product of claim 15, further comprising deploying the virtual units in the virtual system according to the communication link requirement between the virtual units, the communication link requirement comprising satisfying a communication bandwidth requirement between the virtual units and satisfying a latency requirement between the virtual units.

17. The computer program product of claim 16, wherein satisfying the communication bandwidth requirement between the virtual units and the latency requirement between the virtual units only applies within the computing environment.

18. The computer program product of claim 15, further comprising deploying the virtual units in the virtual system according to the location requirement between the virtual units, deploying the virtual units according to the location requirement comprising satisfying a collocation requirement between two or more virtual units.

19. The computer program product of claim 18, wherein the collocation requirement causes the two or more virtual units to be instantiated in a same zone.

20. The computer program product of claim 15, further comprising providing, by the processor, a mechanism for a user to specify the virtual system definition that is utilized to create the virtual units; and
   providing, by the processor, the mechanism for the user to specify each of the relationship constraints between the virtual units in the virtual system.

21. The method of claim 1, wherein the component of the computing environment is a service.

22. The method of claim 1, wherein the component of the computing environment is hardware.

* * * * *